Figure 1:
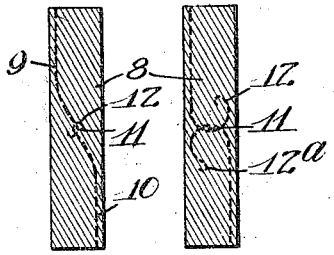

D. B. LUTEN.
REINFORCED CONCRETE CONSTRUCTION.
APPLICATION FILED OCT. 1, 1906.

999,663.

Patented Aug. 1, 1911.

UNITED STATES PATENT OFFICE.

DANIEL B. LUTEN, OF INDIANAPOLIS, INDIANA.

REINFORCED CONCRETE CONSTRUCTION.

999,663.  Specification of Letters Patent.  Patented Aug. 1, 1911.

Original application filed May 17, 1902, Serial No. 107,812. Divided and application filed July 23, 1904, Serial No. 217,767. Divided and this application filed October 1, 1906. Serial No. 336,832.

*To all whom it may concern:*

Be it known that I, DANIEL B. LUTEN, a citizen of the United States, residing at Indianapolis, in the county of Marion and State of Indiana, have invented new and useful Improvements in Reinforced Concrete Construction, of which the following is a full, clear, concise, and exact description, reference being had to the accompanying drawing, forming a part of this specification.

This invention relates to improvements in reinforced concrete construction, particularly of arches, walls, columns, beams and the like; my invention being more particularly, although not exclusively, designed for such members when used as parts of bridges, sewers, buildings, etc., which are commonly constructed of concrete, cement, mortar and other materials, and the invention has for its general object to provide an improved construction of the members above mentioned, characterized by greater strength and durability and capacity to resist the various strains to which they may be subjected in any and all directions, together with greater economy with respect to cost of materials and construction as compared with similar structures at present in use.

To these and other ends my invention consists in general in an arch, wall, column or beam structure having incorporated therein tension or reinforcing members anchored in the concrete, cement, mortar or other material used in the structure and so disposed as to bond the structure against breakage in all directions in which it may be subjected to strains.
The present application constitutes a division of an application filed by me on the 23rd day of July 1904, Serial No. 217,767, which is a division of an application filed by me on May 17, 1902, Serial No. 107,812.
To anchor a steel bar or like tension member in concrete, etc., what is desired is a gradual tangential curving of the bar or other tension member, not sharp enough to crush the concrete under heavy tension, and the extension of said bar or other tension member far enough into the mass of the concrete, etc., to securely anchor the rod or other tension member by adhesion or friction; and since the tension decreases as the rod extends into the anchorage, the radius of the curve of the anchoring extension may be decreased without danger of crushing the concrete; resulting in a spiral curve in most instances, though in some cases where the space is limited in certain directions, the rod may be turned back, assuming the form of a curve of contrary flexure.

In the accompanying drawings are illustrated structural members wherein horizontal, lengthwise, and widthwise, bonding of the concrete, etc., in the members is secured by bending the end portions of the tension members and uniting them to one or more adjacent companion members as by hooking or looping them around the latter instead of employing separate transverse bonding members.

Figure 2:
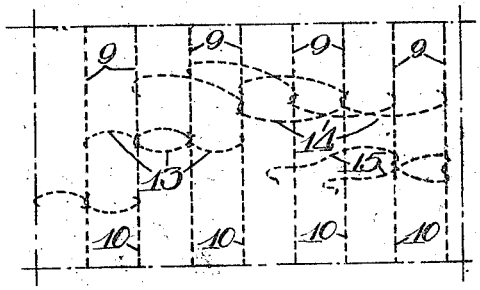

Referring to the accompanying drawings, Figures 1 and 2 show a wall or analogous structural member with embedded tension rods which are joined or spliced by weaving them across and hooking them to or near a companion rod more or less closely positioned relatively thereto.

In Fig. 1, 8 may designate a wall having embedded therein near one face, a series of downwardly and inwardly extending rods 9 and near the opposite face a corresponding series of upwardly and inwardly extending rods 10. The meeting ends of these rods are hooked over each other as shown at 11, and their end portions may be extended more or less beyond their points of intersection and anchored in the material of the wall, etc., preferably as shown, ending in a tangential curve of increasing curvature, as shown at 12, and in any case the curve may take the form of one of the contrary flexure, as at 12$^a$. It is to be noted that with the end portions of tension rods 9 and 10 arranged as just mentioned, they become bonding devices to anchor the two rods into one continuous member.

Fig. 2 of the drawings illustrates modifications of the bonding features hereinbefore described, wherein the horizontal, lengthwise, or widthwise bonding effect is secured in a variety of forms. As shown, the upper and lower series of tension rods 9 and 10 not only interloop with their respective companion rods in the same vertical plane, but at their meeting ends are carried in opposite directions, the distance of one, two or more rods, as shown at 13, 14 and 15, respectively, and are hooked around or near to the vertical portions of oppositely extending rods.

From the foregoing description it will be seen that though the improvements herein described may be simple in character, they will be thoroughly efficient in securing the objects designed; and while other forms and other methods all within the spirit of the invention are apparent, those described are deemed sufficient for purposes of illustration.

Having thus described my invention what I claim as new and desire to secure by Letters Patent is:

1. A structural member of hardened plastic material with two tension members embedded, provided with overlapping curved extensions substantially tangential to the members, the curves of said extensions being of decreasing radii.

2. Tension members embedded in hardened plastic material and bonded by overlapping spiral extensions substantially tangential to the members.

3. A tension member bonded to another tension member by interlocking spiral curves substantially tangential to the members and both embedded in hardened plastic material.

4. A tension member anchored in hardened plastic material by a substantially tangential curve of decreasing radius inclosing another tension member.

5. The combination with a member of hardened plastic material of a substantially straight tension member having an anchor tip consisting of a spiral substantially tangential to the tension member, and embedded in the hardened plastic material.

6. The combination with a member of hardened plastic material, of a tension member having an anchor tip comprising a spiral of increasing curvature substantially tangential to the tension member and embedded in the hardened plastic material.

7. The combination with a member of hardened plastic material, of a tension member having an anchor tip consisting of a curve of contrary flexure substantially tangential to the tension member and embedded in the hardened plastic material.

In witness whereof, I have hereunto subscribed my name in the presence of two witnesses.

DANIEL B. LUTEN.

Witnesses:
W. L. LUTEN,
C. H. KNIGHT.